United States Patent
Wang

(10) Patent No.: US 10,534,201 B2
(45) Date of Patent: Jan. 14, 2020

(54) FULL-FRAME ADHESIVE ANTI-FOG FILM STRUCTURE

(71) Applicant: U-GIN ADVANCED MATERIAL CO., LTD., Taoyuan (TW)

(72) Inventor: Cheng-Shih Wang, New Taipei (TW)

(73) Assignee: U-Gin Advanced Material Co., Ltd., Taoyuan (TW)

( * ) Notice: Subject to any disclaimer, the term of this patent is extended or adjusted under 35 U.S.C. 154(b) by 0 days.

(21) Appl. No.: 16/055,254

(22) Filed: Aug. 6, 2018

(65) Prior Publication Data

US 2019/0137790 A1    May 9, 2019

Related U.S. Application Data

(63) Continuation of application No. 15/230,883, filed on Aug. 8, 2016, now Pat. No. 10,042,185.

(30) Foreign Application Priority Data

Sep. 4, 2015  (TW) .............................. 104214393 U

(51) Int. Cl.
   *G02C 11/08*    (2006.01)
   *G02C 7/10*    (2006.01)
   (Continued)

(52) U.S. Cl.
   CPC .......... *G02C 11/08* (2013.01); *B29D 11/0073* (2013.01); *B29D 11/00894* (2013.01);
   (Continued)

(58) Field of Classification Search
   CPC ......... B32B 27/08; B32B 27/065; B32B 7/12;
   B32B 7/06; B32B 5/18; B32B 27/00;
   B32B 2307/748; B32B 2307/732; B32B
   2307/7265; B32B 2307/7242; B32B
   2307/71; B32B 2307/412; B32B
   2307/402; B32B 2307/40; B32B
   2307/306; B32B 2266/0221; B32B
   2255/10;
   (Continued)

(56) References Cited

U.S. PATENT DOCUMENTS

2008/0062378 A1    3/2008   McCracken
2012/0236255 A1    9/2012   Jiang
(Continued)

*Primary Examiner* — Tuyen Tra
(74) *Attorney, Agent, or Firm* — N.V. Nederlandsch Octrooibureau; Catherine A. Shultz; Katelyn J. Bernier

(57) ABSTRACT

The present invention is to provide a full-frame adhesive anti-fog film structure, comprising: an anti-fog film, which has a front side and a back side opposing the front side; and an adhesive, which is disposed at an edge of the back side and arranged along the edge so as to be frame-shaped. The anti-fog film of the present invention is attachable to a planar, cylindrical or spherical lens through the full frame-shaped adhesive so that not only can the anti-fog film be fully attached to the lens but the full attachment of film also prevents bubbles from forming between the two attached surfaces. Also, an airtight space is formed between the full-frame adhesive anti-fog film structure and the lens to stop heat transfer and prevent fog from being formed, so as to not only provide good vision to users but also reduce the chance that the user will fall prey to an accident if the user's view is blocked.

20 Claims, 5 Drawing Sheets

(51) Int. Cl.
*G02C 7/12* (2006.01)
*B29D 11/00* (2006.01)
*G02B 27/00* (2006.01)
*B32B 27/00* (2006.01)
*B32B 5/18* (2006.01)
*B32B 7/06* (2019.01)
*B32B 7/12* (2006.01)
*B32B 27/06* (2006.01)
*B32B 27/08* (2006.01)
*B29K 23/00* (2006.01)
*B29K 1/00* (2006.01)
*A42B 3/24* (2006.01)

(52) U.S. Cl.
CPC .................. *B32B 5/18* (2013.01); *B32B 7/06* (2013.01); *B32B 7/12* (2013.01); *B32B 27/00* (2013.01); *B32B 27/065* (2013.01); *B32B 27/08* (2013.01); *G02B 27/0006* (2013.01); *G02C 7/10* (2013.01); *G02C 7/12* (2013.01); *A42B 3/24* (2013.01); *B29D 11/00644* (2013.01); *B29K 2001/12* (2013.01); *B29K 2023/083* (2013.01); *B29K 2995/0034* (2013.01); *B29K 2995/0037* (2013.01); *B32B 2255/10* (2013.01); *B32B 2266/0221* (2013.01); *B32B 2307/306* (2013.01); *B32B 2307/40* (2013.01); *B32B 2307/402* (2013.01); *B32B 2307/412* (2013.01); *B32B 2307/42* (2013.01); *B32B 2307/70* (2013.01); *B32B 2307/71* (2013.01); *B32B 2307/7242* (2013.01); *B32B 2307/7265* (2013.01); *B32B 2307/732* (2013.01); *B32B 2307/748* (2013.01); *B32B 2310/0418* (2013.01); *B32B 2317/18* (2013.01); *B32B 2323/04* (2013.01)

(58) Field of Classification Search
CPC ............ B32B 2317/18; B32B 2323/04; B32B 2307/70; B32B 2307/42; B32B 2310/0418; B29D 11/0073; B29D 11/00894; B29D 11/00644; B29K 2995/0037; B29K 2995/0034; B29K 2001/12; B29K 2023/083; G02C 11/08; G02C 7/12; G02C 7/10; G02B 27/0006; A42B 3/24
USPC ...................................................... 351/41, 44
See application file for complete search history.

(56) References Cited

U.S. PATENT DOCUMENTS

| | | |
|---|---|---|
| 2013/0075962 A1 | 3/2013 | Jigami |
| 2015/0309216 A1 | 10/2015 | Fournand |
| 2016/0209554 A1 | 7/2016 | Cheng |
| 2019/0016084 A1* | 1/2019 | Hayashi .................. G02B 1/18 |
| 2019/0217581 A1* | 7/2019 | Fujihara .................. B32B 7/12 |

* cited by examiner

FULL-FRAME ADHESIVE ANTI-FOG FILM STRUCTURE

BACKGROUND OF THE INVENTION

1. Technical Field

The present invention relates to an anti-fog lens for a safety helmet and an anti-fog film attachable to a lens for a safety helmet.

2. Description of Related Art

Safety helmet is personal protection equipment for head, which can efficiently cushion and reduce the impact of head, preventing and decreasing the frameage of human head. The application of safety helmet is widely seen in building industry, traffic, and various kinds of industries. Recently, sale markets have many types of safety helmets. The semi-cover type helmet and full-face helmet are the most commonly seen ones. Apart from wearing the safety helmet to protect head, the user also installs a lens in front of the safety helmet to protect their face. In sunny days, the lens can block the sunlight from directly irradiating the user's face; during the bad weather, the lens can also avoid the cold wind and rain directly attacking the faces; further, the lens can prevent insects, small rocks, dust, and unknown matters attacking the faces.

Nevertheless, during cold days or low temperature of the outside environment, the temperature difference formed from the user's body heat and the cold temperature of the outside environment, may lead the steam of the air condensed and generate fog on the surfaces of the lens; and due to the temperature difference, the fog on the lens is hard to disperse instantly. Before the fog dispersing, the user is in a dangerous condition because of his sight is blurred or is completely covered, such that if the user is during driving or doing other hazardous work, it is extremely possible to have accident. This does not only threat the users' individual safety, but also may hurt other people, causing irreparable tragedy.

SUMMARY OF THE INVENTION

The present invention is to solve the problem that fogs may form on the lens of a helmet and thus obstructing the user's view.

In order to solve the above, the present invention is to provide a full-frame adhesive anti-fog film structure, comprising: an anti-fog film, which has a front side and a back side opposing the front side; and an adhesive, which is disposed at an edge of the back side and arranged along the edge so as to be frame-shaped.

Preferably, the anti-fog film is made of triacetate (TAC) film.

Preferably, the anti-fog film is attached to a lens through the adhesive, and an airtight space is formed between the full-frame adhesive anti-fog film structure and the lens.

Preferably, the full-frame adhesive anti-fog film structure is attached to the lens at a position which corresponds to a user's eyes.

Preferably, the anti-fog film is a transparent film.

Preferably, a UV-blocking colored film is attached to the front side or back side of the anti-fog film.

Preferably, a UV-blocking dyeing treatment is performed on the anti-fog film.

Preferably, a polarizing film for eliminating polarized light is attached to the front side or back side of the anti-fog film.

Preferably, a polarization treatment is performed on the anti-fog film.

Preferably, a release film is attached to the front side to fully cover the front side.

Preferably, the adhesive is EVA foam tape.

Preferably, the TAC film is treated by alkalinization, neutralizing, rinsing and baking treatment to have a water contact angle of its surface is less than 30°.

Preferably, an alkaline etching solution with a temperature of 40 to 60° C. is used in the alkalinization.

Preferably, an immersion process of the alkalinization treatment takes at least 30 seconds.

Preferably, the anti-fog film has a thickness of 40 μm to 250 μm.

Accordingly, the present invention has the following advantages:

1. The anti-fog film of the present invention is attachable to a planar, cylindrical or spherical lens through the full frame-shaped adhesive so that not only can the anti-fog film be fully attached to the lens but the full attachment of film also prevents bubbles from forming between the two attached surfaces.

2. An airtight space is formed between the full-frame adhesive anti-fog film structure and the lens to stop heat transfer and prevent fog from being formed, so as to not only provide good vision to users but also reduce the chance that the user will fall prey to an accident if the user's view is blocked.

BRIEF DESCRIPTION OF THE DRAWINGS

The accompanying drawings, together with the specification, illustrate exemplary embodiments of the present invention, and, together with the description, serve to explain the principles of the present invention.

FIG. 3-1 shows the schematic diagram of the anti-fog film shape (1) of the present invention.

FIG. 3-2 shows the schematic diagram of the anti-fog film shape (2) of the present invention.

DETAILED DESCRIPTION OF THE INVENTION

Figure 1:
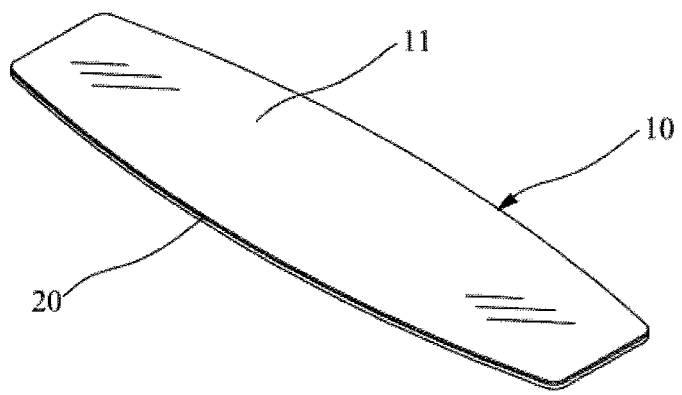
FIG. 1 shows the three-dimensional appearance of the full-frame adhesive anti-fog film structure of the present invention.
Figure 2:
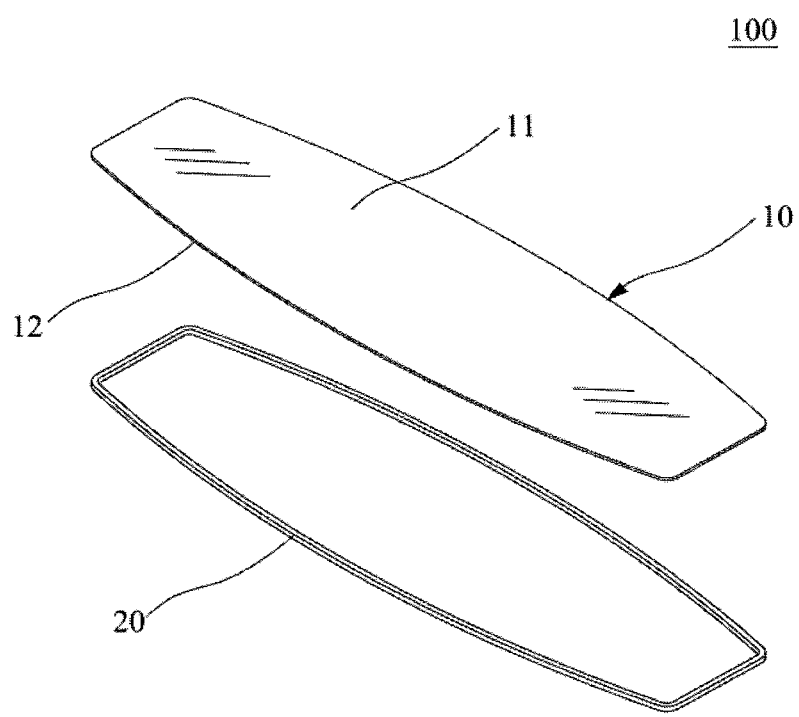
FIG. 2 shows the exploded perspective view of the full-frame adhesive anti-fog film structure of the present invention.

The present invention is illustrated with a preferred embodiment and described below. Referring to FIG. 1 and FIG. 2, the present invention provides a full-frame adhesive anti-fog film structure 100 attachable to various planar, cylindrical or spherical lenses to prevent fog from forming thereon.

The full-frame adhesive anti-fog film structure 100 essentially comprises an anti-fog film 10 and an adhesive 20. The anti-fog film 10 has a front side 11 and a back side 12 opposing the front side 11. In a preferred embodiment, the anti-fog film 10 is made of triacetate (TAC) film and thus exhibits optical characteristics, such as highly transparent and free of rainbow pattern, thereby providing good vision to users.

The anti-fog film 10 of the present invention is preferably produced by an anti-fog film manufacturing method which comprises the steps of: alkalinizing a major content TAC (also known as TAC film) of the anti-fog film 10; neutralizing and rinsing; and baking. The anti-fog film manufacturing method is characterized in that the TAC undergoes the alkalinization treatment with a 6-9% alkaline etching solution.

The TAC is a commercially-available TAC film and has a thickness of 25 μm to 270 μm, preferably 60 μm to 270 μm, such as 60 μm, 120 μm, 180 μm and 270 μm. The purpose of the alkalinization treatment is to turn the —OCOCH3 group of TAC, partly or mostly, into the hydrophilic —OH group by hydrolysis so as to form a highly hydrophilic surface structure. In this regard, the alkaline etching solution is preferably, but is not limited to, sodium hydroxide (NaOH) or potassium hydroxide (KOH). The temperature of the alkaline etching solution is 40 to 60° C., preferably 50 to 60° C., and most preferably 60° C. An immersion process of the alkalinization treatment takes at least 30 seconds, preferably 30 seconds to 80 seconds, and most preferably 60 seconds.

According to the present invention, preferably, the anti-fog film 10 has a thickness of 40 nm to 250 nm.

Regarding the anti-fog film 10, after its TAC film has undergone alkalinization treatment, a water contact angle of its surface is less than 30°, preferably less than 25°. The water contact angle is the included angle formed at the liquid/gas interface contact solid surface. The alkalinization treatment renders the surface of the TAC film highly hydrophilic, and the process of the alkalinization treatment is crucial to the hydrophilicity of the surface of the TAC film. The hydrophilicity of the surface of the TAC film depends on its contact angle relative to droplets. The smaller the water contact angle, the higher the hydrophilicity, and vice versa.

The neutralizing and rinsing step of the manufacturing method is carried out with pure water. The pure water includes, but is not limited to, pure water, ion-exchange water, and ultrasonic pure water and operates at 20 to 60° C., preferably 30 to 50° C., wherein the immersion process takes at least 15 seconds, preferably at least 20 seconds.

The baking step of the manufacturing method requires a heat source chosen as needed, including but not limited to a drying oven with a hot plate or a drying oven with infrared (IR). The baking process is carried out by hot wind drying at 50 to 100° C., preferably 60 to 90° C. The drying time depends on the thickness of the TAC film. For example, when the film is 25 nm thick, the drying process takes 60 seconds preferably.

In the preferred embodiment, the anti-fog film 10 is a transparent film. The transparent film has a full-light penetration rate of around 92% or higher, which is too high to block UV.

In the preferred embodiment, a UV-blocking colored film is attached to the front side 11 or back side 12 of the anti-fog film 10, or UV-blocking dyeing treatment is performed on the anti-fog film 10. The colored film has a full-light penetration rate of around 60% or higher and bears a color, such as orange-brown or slate blue. With the anti-fog film 10 being dyed or covered with the colored film, the anti-fog film 10 is capable of blocking UV, thereby protecting users' eyes from corneal infections, conjunctivitis or cataract, which might otherwise afflict the users' eyes as a result of excessive absorption of UV by the users' eyes.

In the preferred embodiment, a polarizing film for eliminating polarized light is attached to the front side 11 or back side 12 of the anti-fog film 10, or polarization treatment is performed on the anti-fog film 10. The polarizing film has a full-light penetration rate of around 40% or higher to eliminate various types of irregular light, such as reflected light, intense light, or glare, and reduce the light reflected off the surface of a road, water or ground covered with snow, thereby providing good vision to users.

In the preferred embodiment, a release film (not shown) is attached to the front side 11 to fully cover the front side 11. The release film prevents the anti-fog film 10 from getting damaged before use, which, if happens, will not only render the anti-fog film 10 unusable but also cause a waste of materials.

Figures 1, 3:
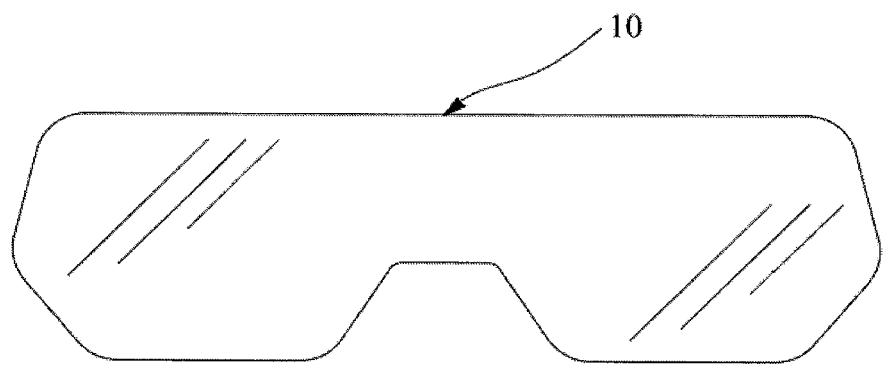
Figures 2, 3:
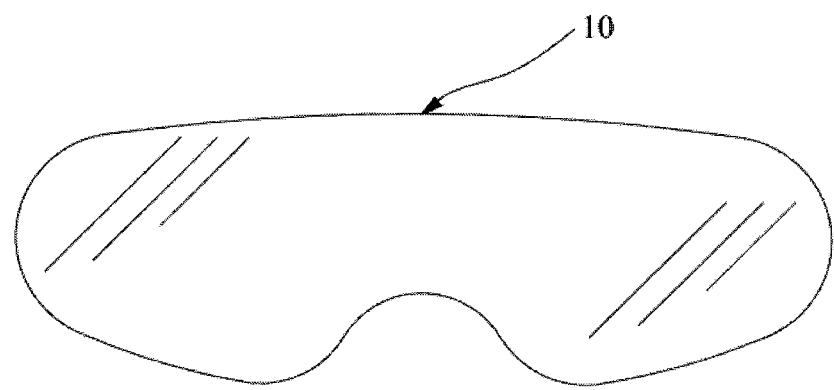

Referring to FIG. 3-1 and FIG. 3-2, there are shown schematic views of the anti-fog film 10 in two variant embodiments of the present invention, respectively. As shown in FIG. 3-1, the anti-fog film 10 has a cornered outline. As shown in FIG. 3-2, the anti-fog film 10 has a smooth outline. The present invention is not restrictive of the dimensions, shape or functions of the anti-fog film 10, which are subject to selection by manufacturers as needed for the sake of optimization.

The adhesive 20 is disposed at an edge of the back side 12 and arranged along the edge so as to be frame-shaped. The anti-fog film 10 is attachable to a planar, cylindrical or spherical lens M through the frame-shaped adhesive 20 so that not only can the anti-fog film 10 be fully attached to the lens M but the full attachment of film also prevents bubbles from forming between the two attached surfaces.

In the preferred embodiment, the adhesive 20 is, but is not limited to, EVA foam tape. The EVA foam tape is moisture-proof, solvent-resistant and heat-proof and thus suitable for use as a means of adhering the anti-fog film 10 and the lens M together.

Figure 4:
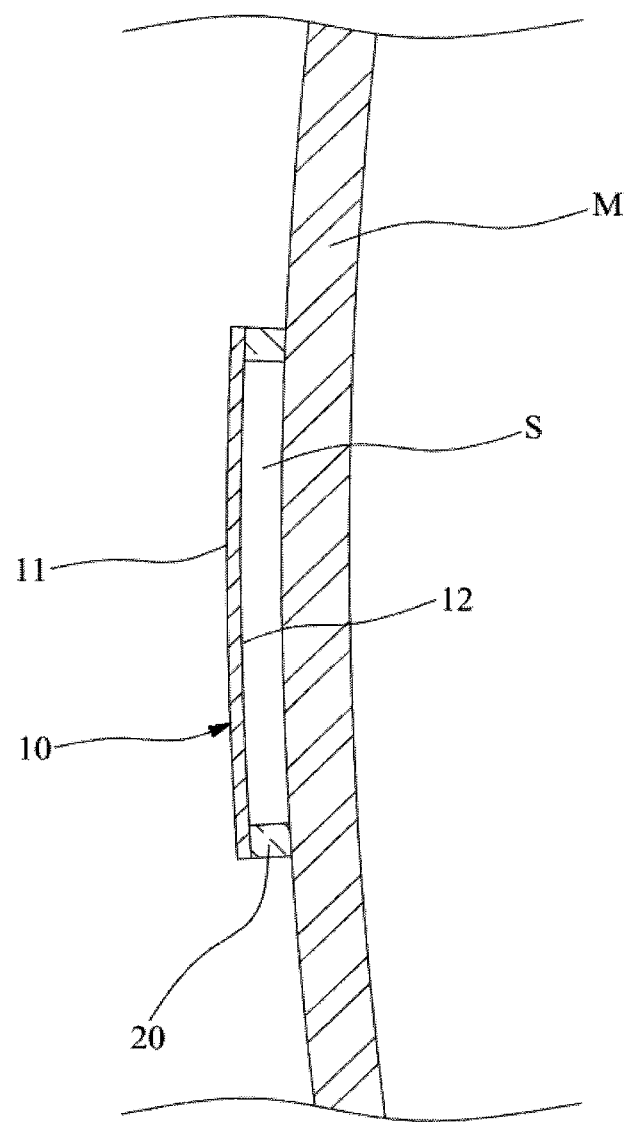
FIG. 4 shows the sectional view of the full-frame adhesive anti-fog film structure pasted on a lens of the present invention.

Referring to FIG. 4, there is shown a cross-sectional view of the full-frame adhesive anti-fog film structure 100 attached to the lens M. The anti-fog film 10 is attached to the lens M through the adhesive 20, and an airtight space S is formed between the full-frame adhesive anti-fog film structure 100 and the lens M. Air is a poor conductor; hence, when air is stagnant, it hinders thermal conduction. Therefore, the airtight space S stops heat transfer effectively and prevents fog from forming on the lens M which the anti-fog film 10 is attached to, thereby providing good vision to users.

Figure 5:
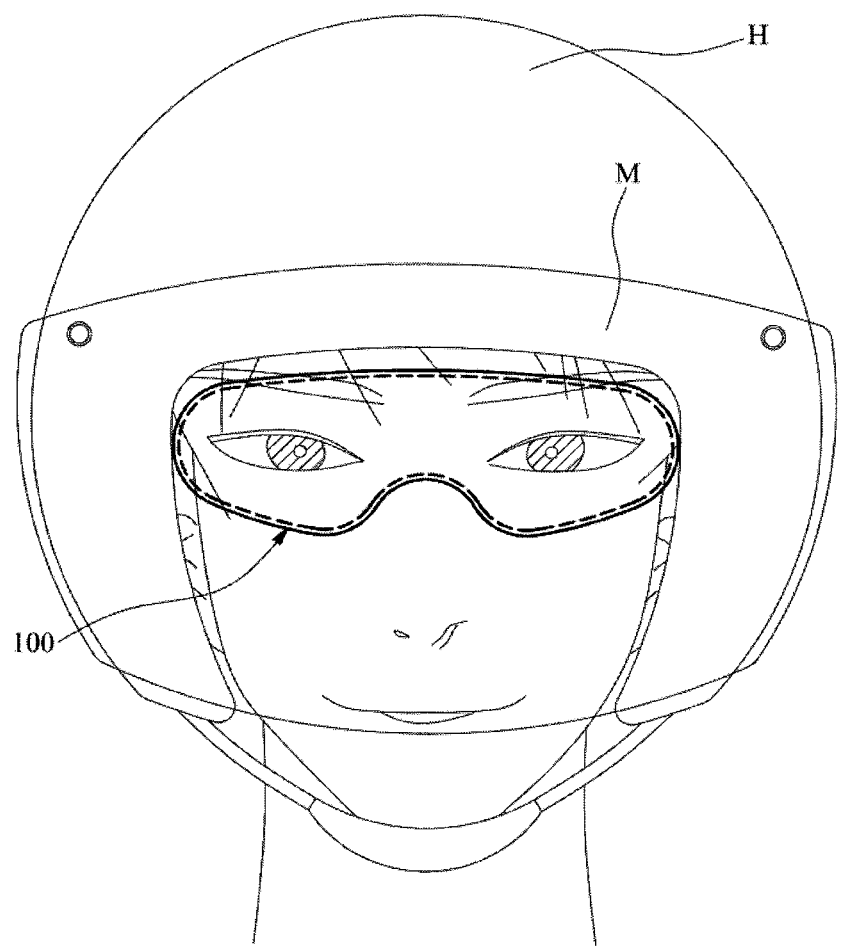
FIG. 5 shows the rear view of the full-frame adhesive anti-fog film structure pasted on a safety helmet of the present invention.

Referring to FIG. 5, there is shown a schematic view of the full-frame adhesive anti-fog film structure 100 attached to the lens M of a helmet H. The full-frame adhesive anti-fog film structure 100 is attached to the lens M and corresponds in position to a user's eyes to ensure that the user's view will not be blocked by fog formed on the lens M, so as to not only provide good vision to the user but also reduce the chance that the user will fall prey to an accident if the user's view is blocked.

In conclusion, a full-frame adhesive anti-fog film structure of the present invention is not only tightly attached to various planar, cylindrical or spherical lenses through a full frame but the full attachment of film also prevents bubbles from forming between the two attached surfaces. Furthermore, an airtight space is formed between the full frame and the lens to stop heat transfer and prevent fog from being formed, so as to not only provide good vision to users but also reduce the chance that the user will fall prey to an accident if the user's view is blocked.

While the present invention has been elaborated by exemplifying certain preferred embodiments, it is not to be limited to the disclosed embodiments. On the contrary, it is intended to cover various modifications and equivalent arrangements included within the spirit and scope of the appended claims and equivalents thereof.

What is claimed is:

1. An anti-fog lens for a safety helmet, the anti-fog lens comprising a curved, transparent shield having an inner surface and an outer surface and an anti-fog film having a front side and a back side opposing the front side, which back side is attached to the inner surface of the lens, wherein the anti-fog film comprises modified triacetate cellulose (TAC) film having a surface that is highly hydrophilic comprising a predominance of hydroxyl (OH) groups and having a water contact angle at least on the front side of less than 30°.

2. The anti-fog lens according to claim 1, wherein the highly hydrophilic surface has a water contact angle of less than 25°.

3. The anti-fog lens according to claim 1, wherein the anti-fog film is a transparent film having a full-light penetration rate of 92% or higher.

4. The anti-fog lens according to claim 1, wherein a further transparent layer is attached to the front side or the back side of the anti-fog film.

5. The anti-fog lens according to claim 4, wherein the further transparent layer is a UV-blocking colored film.

6. The anti-fog lens according to claim 5, wherein the colored film has a full-light penetration rate of around 60% or higher and bears a color.

7. The anti-fog lens according to claim 4, wherein the further transparent layer is a polarizing film.

8. The anti-fog lens according to claim 7, wherein the polarizing film has a full-light penetration rate of around 40% or higher.

9. The anti-fog lens according to claim 1, wherein the anti-fog film is covered in a UV-blocking dye and/or wherein the anti-fog film itself is polarizing.

10. The anti-fog lens according to claim 1, wherein the anti-fog film is fully attached to the lens to prevent bubbles from forming between the two attached surfaces.

11. The anti-fog lens according to claim 1, wherein a position of the anti-fog film on the transparent shield corresponds in position to a user's eyes for maintaining good vision.

12. The anti-fog lens according to claim 1, wherein the anti-fog film has a thickness of 25 μm to 270 μm.

13. The anti-fog lens according to claim 1, wherein the anti-fog film is adhered to the transparent shield.

14. The anti-fog lens according to claim 1, wherein the lens has spherical or cylindrical curvature.

15. A safety helmet provided with an anti-fog lens according to claim 1.

16. An anti-fog film attachable to a lens for a safety helmet, the anti-fog film having a front side and a back side opposing the front side, which back side is arranged for attachment to an inner surface of the lens, wherein the anti-fog film comprises modified triacetate cellulose (TAC) film having a surface that is highly hydrophilic comprising a predominance of hydroxyl (OH) groups and having a water contact angle at least on the front side of less than 30°.

17. The anti-fog film according to claim 16, wherein the highly hydrophilic surface has a water contact angle of less than 25°.

18. The anti-fog film according to claim 16, wherein the triacetate cellulose comprises acetyl groups (OCOCH3) and substantially all of the acetyl groups at the surface have been replaced by hydroxyl (OH) groups.

19. The anti-fog film of claim 16, having a thickness of 25 μm to 270 μm.

20. The anti-fog film of claim 16, having an outline shape corresponding to a viewing region of a full face safety helmet.

* * * * *